United States Patent [19]

Ruecker et al.

[11] Patent Number: 4,885,838

[45] Date of Patent: Dec. 12, 1989

[54] APPARATUS FOR CONNECTING THE FREE CONDUCTOR ENDS OF A CONDUCTOR BUNDLE

[75] Inventors: Christoph Ruecker, Bueren; Wolfgang Thorwesten, Geseke, both of Fed. Rep. of Germany

[73] Assignee: Nixdorf Computer AG, Paderborn, Fed. Rep. of Germany

[21] Appl. No.: 266,911

[22] Filed: Nov. 3, 1988

[30] Foreign Application Priority Data

Nov. 12, 1987 [DE] Fed. Rep. of Germany ....... 3738498

Aug. 5, 1988 [DE] Fed. Rep. of Germany ....... 3826741

[51] Int. Cl.$^4$ ........................ B23P 19/04; H01R 43/04

[52] U.S. Cl. ....................................... 29/566.3; 29/749

[58] Field of Search ................ 29/33 M, 566.1, 566.3, 29/748, 749, 753, 754, 760, 747, 854, 857

[56] References Cited

U.S. PATENT DOCUMENTS

| | | | |
|---|---|---|---|
| 3,875,662 | 4/1975 | Folk | 29/753 |
| 4,020,540 | 5/1977 | Casciotti et al. | 29/749 |
| 4,188,702 | 2/1980 | Herbert | 29/749 |
| 4,393,570 | 7/1983 | Frick et al. | 29/566.1 |
| 4,519,129 | 5/1985 | Caveney et al. | 29/749 |
| 4,554,733 | 11/1985 | Caveney | 29/759 X |
| 4,682,400 | 7/1987 | Casey | 29/566.3 |

FOREIGN PATENT DOCUMENTS

| | | | |
|---|---|---|---|
| 66060 | 12/1982 | European Pat. Off. | 29/749 |

*Primary Examiner*—William Briggs

[57] ABSTRACT

A device for correcting the free conductor ends of a conductor bundle has a support with parallel grooves for holding the ends in a parallel array, a vertically movable heated stamp for adhering or welding a strip of material to the exposed plastic jackets of the conductor ends on the support and a knife for cutting off the portions of the conductor ends extending beyond the connecting strip. The pressing stamp is mounted on a vertically movable carrier plate for vertical movement relative to the plate and is spring biased downwardly, and the knife is fixed to the carrier plate so that the pressing stamp engages and presses the connecting strip to the conductor jackets and the knife then serves the projecting conductor ends as a result of a single downward movement of the carrier plate. A guide arrangement allows easy movement of the conductor support into and out of its work position, and other guides rigidly hold the conductor support in the work position during the operation of the pressing stamp and knife.

13 Claims, 6 Drawing Sheets

APPARATUS FOR CONNECTING THE FREE CONDUCTOR ENDS OF A CONDUCTOR BUNDLE

Figure 1:
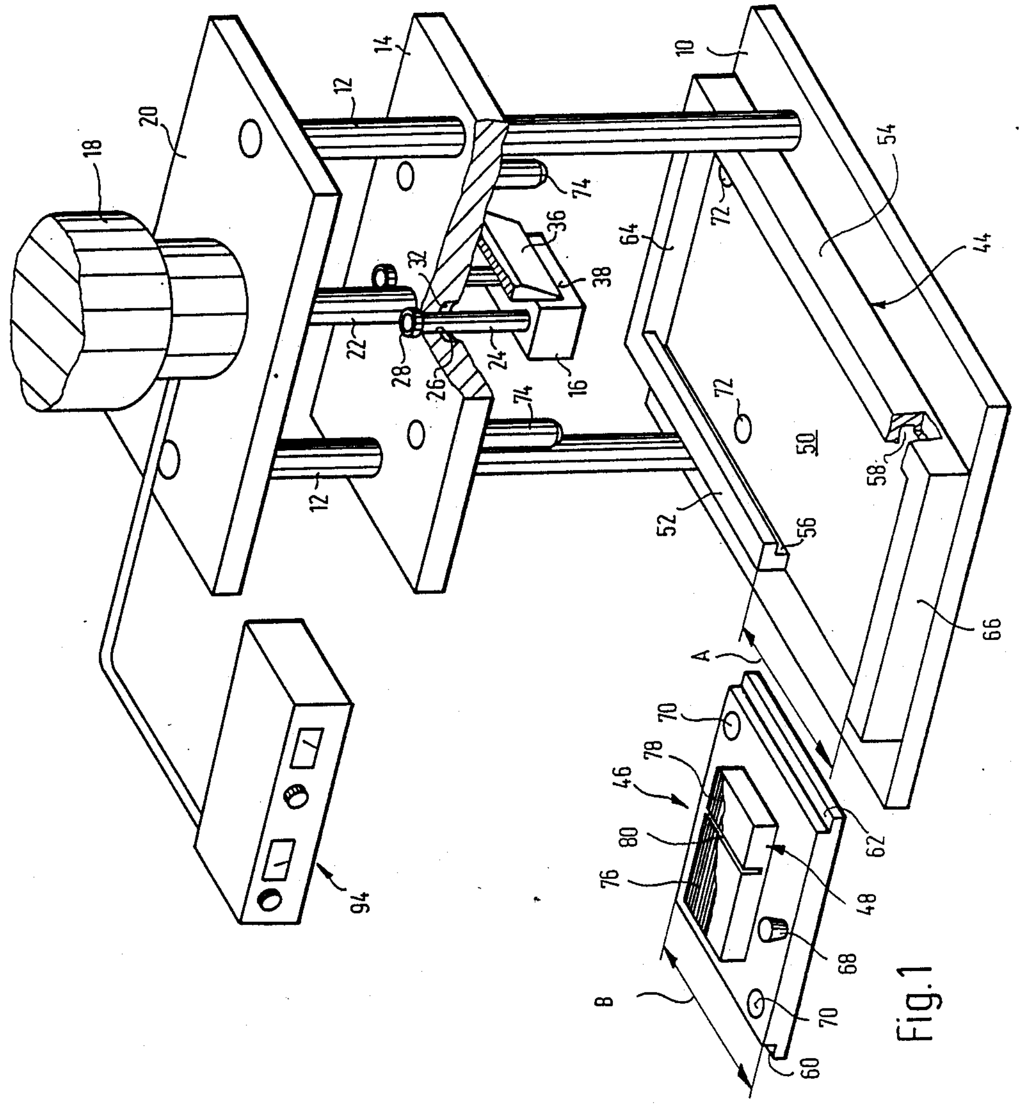

The invention concerns an apparatus for connecting the free conductor ends of a conductor bundle through the temperature assisted pressing onto the conductor ends, which lie parallel to one another, of a strip of material adherable or weldable to the plastic jackets of the individual conductors, which device includes a base plate, a conductor support releasably held on the base plate, and a pressure mechanism with a pressing stamp carrier plate shiftable perpendicularly to the base plate.

An apparatus of the above-mentioned type is known which, by means of an hydraulically driven heated pressing stamp, presses a foil strip onto conductors arranged in the conductor support to adhere or weld the foil strip to the jackets of the conductors and thereby fix the conductors in a given order. The pressing time and the temperature of the pressing stamp can be adjusted by a switch. The conductor support is made as a sorting comb and is stuck onto a carrier element. This carrier element has four bores on its underside which in cooperation with four bolts on the base plate define an exact work position for the conductor support. The positioning of the carrier element is bothersome since the bolts and the bores which receive them in the carrier element are not visible in the positioning process. Further, in the connection of the free conductor ends in this machine one obtains indeed a cable strip with parallel connected conductors which, however, are not of equal length and which have to be cut to equal length in a further work step, making the production more expensive.

In the known apparatus the location of the pressing stamp in its pressing position is determined by height stops. The pressing pressure is therefore not definite but varies with different conductor sizes. Too low a pressure can, however, lead to the individual conductors not being properly connected with the foil strip, thereby requiring a costly subsequent working. With too high a pressure, damage to the conductors is possible. Therefore, a definite pressing pressure in the connecting process is necessary to guarantee a reliable reproducible connection of the conductors.

The invention has as its object the provision of an apparatus of the aforementioned type permitting a secure and reproducible connection of the conductors in such way that the formed flat band cable end can be attached to a plug without further working.

This object is solved in accordance with the invention in that the pressing stamp is supported on the carrier plate for movement parallel to the pressing direction against spring force, and in that a cutting device is arranged on the carrier plate for cutting off the conductor ends extending outwardly beyond the material strip. Preferably the cutting device includes a knife fastened to the carrier plate, the cutting edge of which knife is located between the rest position and the pressing position of the pressing surface of the pressing stamp, with the conductor support having a recess for receiving the knife during the pressing process.

Because of the construction of the apparatus in accordance with invention, in the pressing process the conductors are held fast in the conductor support by the pressing surface of the pressing stamp, are connected with one another by means of the material strip, and upon further approach of the carrier plate toward the base plate are cut by the knife perpendicular to their length direction. This has the advantage that the connected conductor ends form a straight edge and can be attached without further working to a plug.

Since the pressing stamp is supported for movement against a spring force, it rests during the connecting process on the conductors with a definite pressing force determined by the spring tension so that independently of the conductor size a reliable reproducible cable connection can be made.

By guiding the pressing stamp on the carrier plate by means of several bolts applied to the pressing stamp, and which pass through the carrier plate, a stable non-rotatable guiding of the pressing stamp is assured.

In an ergonometrically advantageous embodiment of the inventive device, a sliding guide is applied to the base plate, which guide makes possible a shifting of the conductor support, which is arranged on a slide, parallel to the base plate between a work position, in which the conductor support is in line with the pressing stamp, and a preparatory position, in which the conductor support can be inserted into and taken from the apparatus or in which the insertion and removal of the conductor bundle can take place. This has the advantage that the insertion of the conductor support does not have to take place below the pressing mechanism which is difficult and perhaps contains even the possibility of injury.

In construction the sliding guide is simple to realize if the slide is guided on rails arranged on the base plate, or on a bottom plate of the sliding guide, through a groove and spline arrangement with the work position being defined by a stop located in the path of sliding motion. For better sliding, the slide can be supported by roller or ball bearings. For easy removal of the slide from the sliding guide, and for easy insertion of it into the sliding guide, one of the rails at the preparatory position is lengthened with respect to the other by about at least the length of the slide in the sliding direction and has connected to it at its outwardly extending end a bar arranged perpendicular to the rails. The insertion of the slide takes place from the side and along the bar so that upon alignment of the grooves and splines of the guide and slide a pushing of the slide into the guide can take place without danger of tilting due to the slide not being exactly arranged with respect to the guide.

To guarantee a definite location of the slide during the pressing process despite the slidability of the slide, it is proposed in accordance with the invention that the slide include through guides extending parallel to the pressing direction, which through guides in the working position of the slide align with guide-forming recesses in the bottom plate of the sliding guide and with bolts arranged on the carrier plate. In the pressing position, the bolts on the carrier plate pass through the through guides in the slide and the recesses in the bottom plate. After the return of the pressing mechanism to the rest position, the slide is again moveable in its guide.

In operating with the conductor support, the inserted conductors can be accidently removed from the conductor support by a pull on the conductor bundle. This can be inhibited by arranging a clamp or tension release on the slide for holding fast the conductor bundle.

To avoid a deterioration in the efficiency of the apparatus by cut-off conductor ends lying around the apparatus, at least the side of the conductor support which extends away from the recess for receiving the knife in the direction of the conductor ends to be cut off, has clamping grooves for holding fast the cut-off conductor ends.

With too strong or too weak tension of the conductors between the tension release and the clamping grooves it can happen that the conductors move sideways out of the grooves of the conductor support. To avoid this and to assure that the conductor ends are reliably held to the conductor support and can in simple manner and in little time be laid onto and removed from the conductor support, it is proposed that the holding device be located lower than the groove bases of the grooves on the upper side of the conductor support, and that the grooves in a first section extending toward the conductor ends have groove bases of constant depth for unclampingly separating the conductors, which groove bases in a second section extending toward the holding device fall to a deeper depth at which the width of the grooves is so much smaller than the cross-section of the conductors that the conductors are clamped fast in the grooves.

Because of this construction of the apparatus, the conductors, because of the lower positioning of the holding device with respect to the grooves arranged on the upper side of the conductor support, are biased in the direction toward the groove bases and are held fast in the groove sections with the deeper groove bases. The conductors are in this way tensioned between the deeper grooved section of the conductor support and the clamping grooves of the subsequent clamping support and so are securely held in the groove sections of the conductor support provided for separating the conductors.

In a conductor support which is simple to produce and which has a good clamping effect, the groove profile is at least nearly V-shaped.

To obtain a good connection between the individual conductors and the material strip, the conductor support is preferably made in such a way that the depth of the groove bases in the first section corresponds essentially to one-half the conductor diameter. With this sufficient plastic jacketing of the conductors lies free for contact with the material strip, while at the same time a sufficiently large section of the conductor lies in the groove so that the conductors cannot be shifted relative to one another.

In a further development of the invention, a sorting comb with comb grooves for the sorting of at least two conductors per comb groove is arranged between the holding device and the conductor support, the groove bases of the comb grooves lying below the groove bases of the conductor support. By means of this sorting comb a presorting of the conductors, in accordance, for example, to color codes applied to the conductor jackets, which simplifies the sorting of the individual conductors into the grooves of the conductor support.

The biasing of the conductors toward the groove bases of the conductor support and a securing of the conductors against a pull on the conductor bundle can be combined with one another in an advantageous way if the holding device is formed as a tension relief device.

Figure 2:
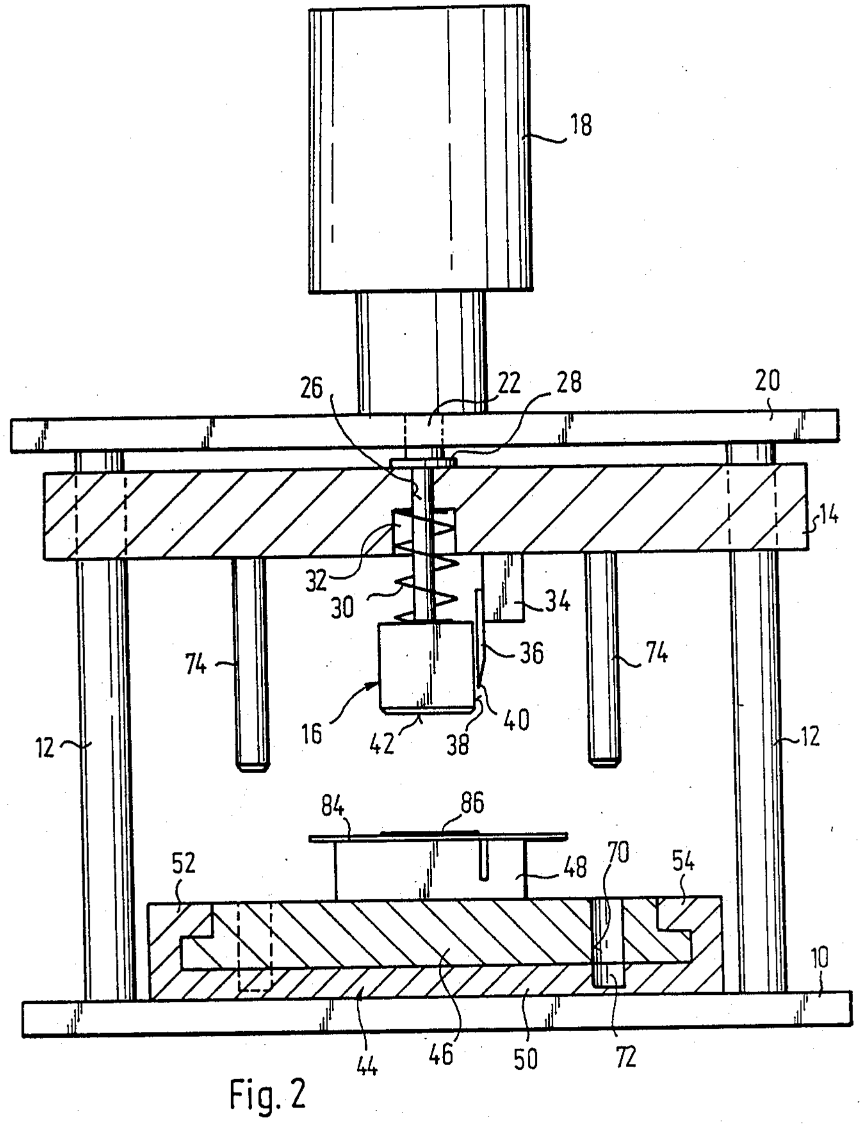
Figure 3:
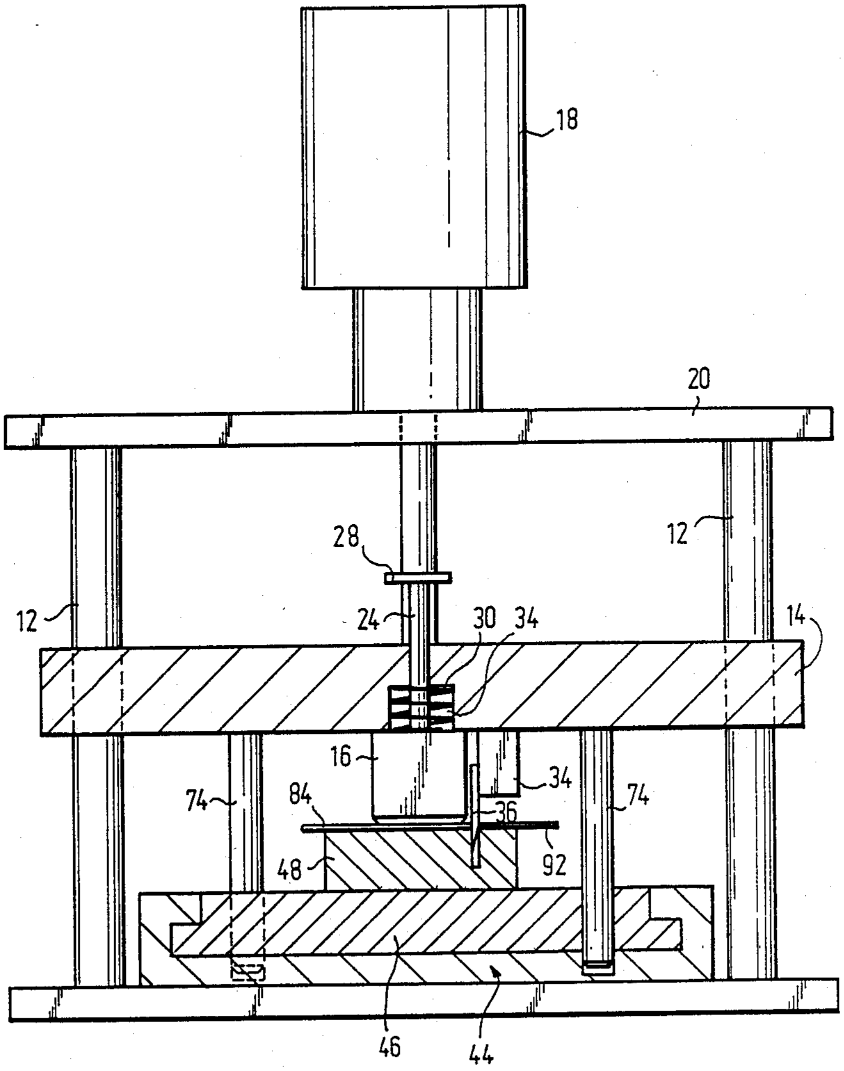
Figure 4:
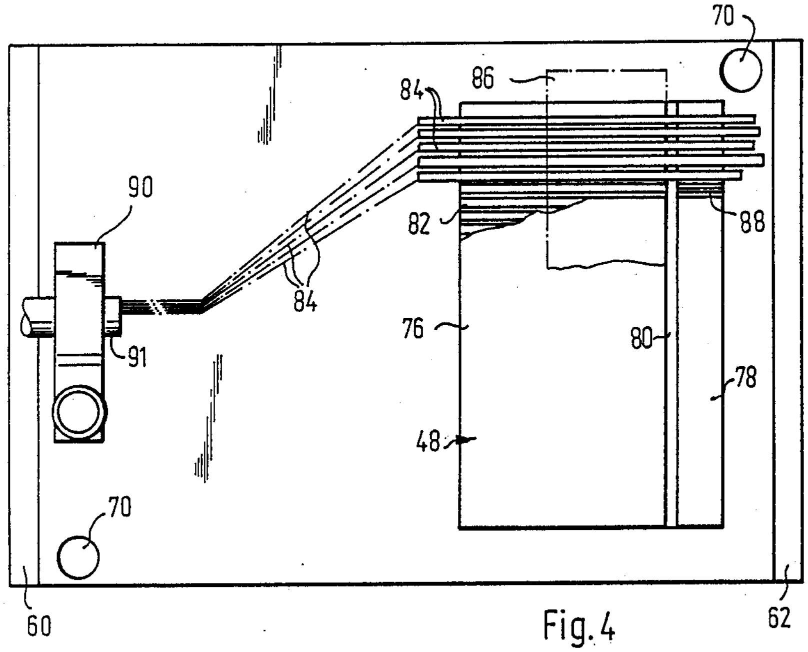
Figure 5:
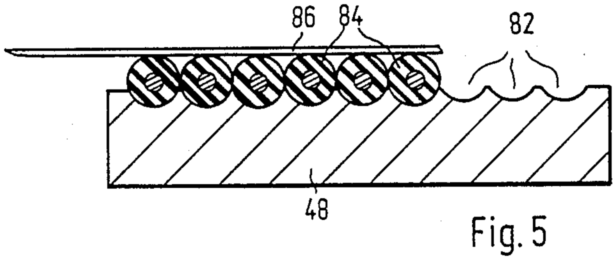
Figure 6:
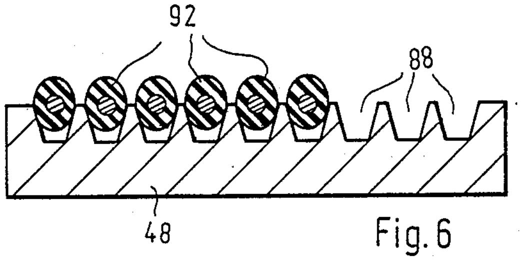
Figure 7:
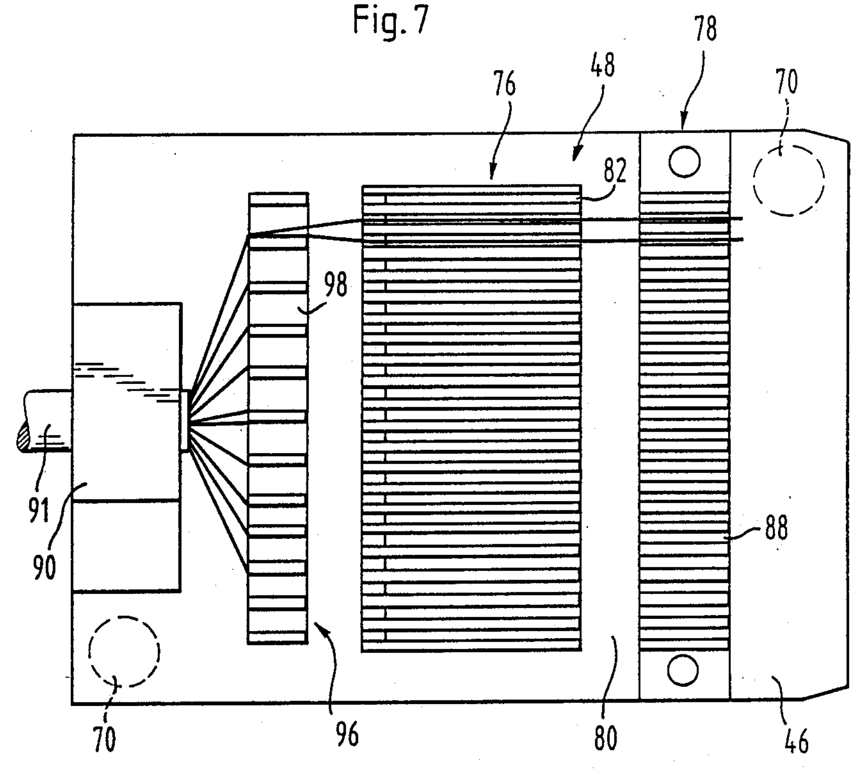
Figure 8:
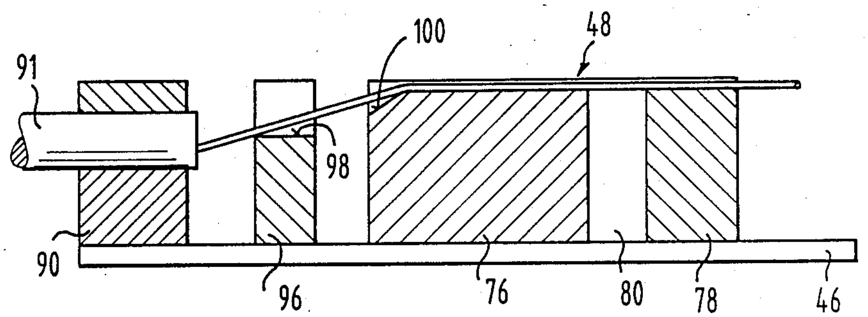
Figure 9:
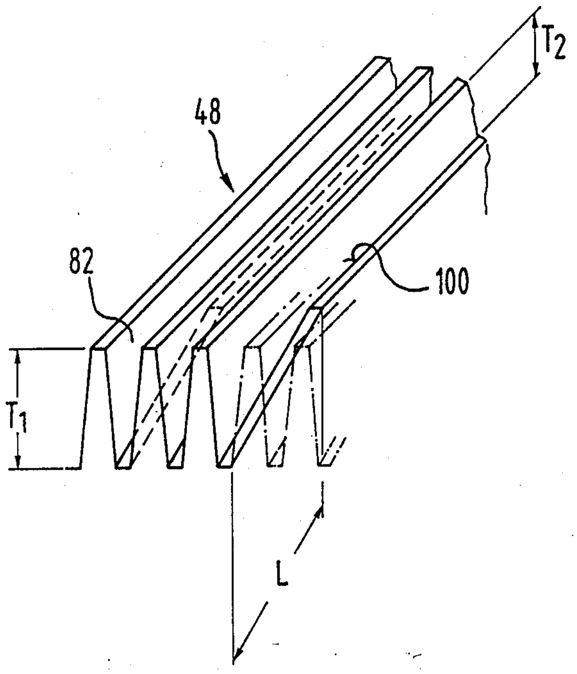

Further features and advantages of the invention will be apparent from the following description, which in connection with the accompanying drawings explain the invention by way of an exemplary embodiment. The drawings show:

FIG. 1. a partially schematic perspective partially sectioned total view of the apparatus in the rest position of the pressing stamp, FIG. 2. a schematic, partially sectioned side view of the apparatus in the rest position of the pressing stamp, FIG. 3. an illustration according to FIG. 2 with the pressing stamp in the pressing position, FIG. 4. a schematic plan view of the slide with conductor support according to a first embodiment, FIG. 5. a cross-section of the conductor support illustrated in FIG. 4 taken perpendicular to the conductor guide in the region of application of the material strip, FIG. 6. a cross-section of the conductor support according to FIG. 4 taken perpendicular to the conductor guide in the region of the conductor ends to be severed, FIG. 7. a plan view of a slide according to a second embodiment of the invention with a holding device for a conductor bundle, a sorting comb and two conductor supports, FIG. 8. a cross-section through the slide along the line VIII—VIII of FIG. 7, and FIG. 9. a perspective, partially schematic view of a part of the conductor support according to FIG. 7.

The device illustrated in FIGS. 1 to 3 includes a base plate 10, to which two guide rods 12 arranged perpendicularly to it are fastened. A carrier plate 14 for a pressing stamp 16 is vertically slidably supported on the guide rods 12 and is arranged parallel to the base plate 10. A pressure fluid activated work cylinder 18 serves for shifting the carrier plate 14, the work cylinder being arranged on a top plate 20 connected to the upper ends of the guide rods 12 and having a piston rod 22 which passes through the top plate 20 parallel to the guide rods 12 and is fixed to the carrier plate 14.

The pressing stamp 16 is guided on the carrier plate 12 by bolts 24 parallel to the guide rods 12, which bolts pass through bores 26 in the carrier plate and are secured against falling from the bores 26 by means of bands 28 at their upper ends. The pressing stamp 16 is biased downwardly from the carrier plate 14 by two helical compression springs 30. The helical compression springs 30 surround the bolts 24 and with their ends which are adjacent the carrier plate 14 later recesses 32 which are coaxial with and of larger diameter than the bores 26. The pressing stamp 16 is heatable in a way not illustrated in detail, for example by means of a resistance heater.

A knife 36 on a block 34 is further arranged on the underside of the carrier plate 14, so that the knife is close to and parallel to one side face 38 of the rectangular pressing stamp 16, with the cutting edge 40 of the knife in the rest position, as illustrated in FIGS. 1 and 2, lying above the pressing surface 42 of the pressing stamp. The purpose of this arrangement is explained below in further detail.

A sliding guide, indicated generally at 44, is arranged on the base plate 10 and carries a conductor support 48. The sliding guide consists of a rectangular bottom plate 50 resting on the base plate 10, with two guide rails 52 and 54 being arranged along the longitudinal sides of the bottom plate 50. The guide rails 52 and 54 have grooves 56 and 58, respectively, on their sides facing one another, which grooves are designed to receive splines 60 and 62, respectively, on the slide 46. At their rear ends as seen in FIG. 1 the guide rails 52 and 54 are connected with one another by a stop bar 64 extending along the short rectangular side of the bottom plate 50. A guide bar 66 extends along the rectangular side of the bottom plate 50 which is opposite to the stop bar 64, the guide bar 66 being connected only with the guide rail 54. The other guide rail 52 is shorter than the guide rail 54 by an amount A which is at least equal to the width B of the slide 46, so that between the free end of the guide rail 54 and the guide bar 66 an opening is formed through which the slide 46 can be inserted into the sliding guide 44 perpendicularly to the longitudinal direction of the guide rails 52, 54.

The insertion of the slide 46 along the guide bar 66 makes it possible to bring the slide 46 into a preparatory or exit position from which it can then be pushed between the guide rails 52 and 54 to the definite work or end position determined by the stop bar 64. For easier manipulation of the slide 46 a knob 68 is fastened to the upper side of the slide.

To arrest the slide in its work position and thereby to inhibit movement of the conductor support 48 during the pressing of the pressing stamp 16, the slide 46 adjacent two corners diagonally opposite one another has through bores 70 directed perpendicularly to its upper surface, which through bores in the end position of the slide 46 register with recesses 72 in the bottom plate 50 of the sliding guide 40 and with pins 74 on the underside of the carrier plate 14. Upon lowering of the carrier plate 14 the pins 74 pass through the bores 70 of the slide 46 and enter the recesses 72 in the bottom plate 50 and thereby arrest the slide 46 immovably in its work position.

The rectangularly shaped conductor support 48 includes two sections 76 and 78 which are separated from one another by an upwardly open slot 80. The section 76 has a plurality of trough-shaped recesses 82 arranged parallel to one another on its upper surface, in which recesses the conductors 84 of a cable or conductor bundle 91 can be laid, and which conductors are to be connected to one another by means of a foil strip 86. On the upper surface of the section 78 each trough-shaped recess 82 is continued by a clamping groove 88 of trapezoidal cross-section, in which the end section 92 of the associated conductor 84 is held fast (FIG. 6). A cable clamp 90 is further arranged on the slide 46 as illustrated in FIG. 4, which clamp serves to hold fast the conductor bundle or cable 91 whose individual conductors 84 are to be arranged on the conductor support which serves as a sorting comb. By means of the clamp an accidental removal of the conductors 84 from the conductor support 58 by a pull on the cable is avoided.

The apparatus as described to this point operates as follows:

The slide 46 with the already loaded conductor support 48 is inserted sideways into the sliding guide. The lateral gap in the sliding guide 44, which is formed by the shortening of the guide rail 52 with respect to the other guide rail 54, serves to allow this insertion. When the spline 62 of the slide 48 is received in the groove 58 of the guide rail 54 the slide is pushed to its work position as defined by the stop 64.

After the conductor support 48, with the parallel conductors 84 arranged thereon and with the foil strip 86 laying on the conductors, is brought to the work position, a lowering of the carrier plate 14 with the heated pressing stamp 16 occurs through operation of the work cylinder 18. The bolts arranged on the carrier plate 14 pass through the through guides 70 of the slide 46 and enter the recesses 72 of the bottom plate 50 of the guide 44 and thereby hold the conductor support 48 rigidly in the work position during the pressing process. The pressing face 42 of the heated pressing stamp presses the foil strip 86 lying on the conductors arranged on the conductor support so that the foil strip 86 is welded or adhered to the conductors 84. From that time on, during which the pressing face 42 of the pressing stamp 16 rests on the applied foil strip 86, the cutting edge 40 of the knife 36 rigidly connected with the carrier plate 14 moves as a result of further downward movement of the carrier plate 14 in the pressing direction and moves past the pressing face 42 of the pressing stamp. The conductor ends 92 held fast in the clamping grooves 88 are thereby separated from the conductors 84 clamped fast under the pressing stamp 16. The cutting knife 36 enters into the slot 80 formed in the conductor support 48. The apparatus remains in the pressing position (FIG. 3) for an adjustable pressing time individual to the conductors. The pressing time and the temperature of the pressing stamp 16 can be adjusted by a control device 94. A return to the starting position (FIG. 2) follows by further operation of the work cylinder 18. After pulling the slide 46 out of its work position to the preparatory position the slide 46 and the conductor support 48 can be removed from the apparatus. A further slide with an already loaded conductor support can now be inserted into the apparatus.

FIGS. 7–9 illustrate a further embodiment of a slide with conductor support, as explained in more detail below, with the same parts being given the same reference numbers.

The rectangular slide 46 illustrated in FIG. 7 carries on its one end a holding apparatus or cable clamp 90 for the cable or conductor bundle 91 which serves as a tension release. Between the holding device 90 and the first section 76 of the conductor support 48 is arranged a sorting comb 96. This comb has comb grooves 96 arranged parallel to one another on its upper side, in which grooves the conductors extending out of the cable 91 can be presorted into small conductor bundles eventually ordered according to color.

The first section 76 of the conductor support 48 has a plurality of grooves 82 arranged parallel to one another on its upper side, which grooves are arranged parallel to the comb grooves 98 of the sorting comb 96. Each conductor of a conductor bundle coming from the sorting comb 96 is arranged in a groove 82 on the section 76. In a first longitudinal portion remote from the sorting comb the groove bases 100 of the grooves 82 are parallel to the upper surface of the conductor support 48 with the depth T2 of the grooves being substantially equal to half the diameter of the conductors. In a second longitudinal portion extending toward the sorting comb 96 the groove bases 100 of the grooves 82 of the first section 76 of the conductor support 48 descend in going toward the sorting comb, in a region of length L, from the small depth T2 to a larger depth T1 (FIG. 9). The profiles of the grooves 82 are V-shaped, with their widths at the upper ends being somewhat larger, and at the depth T1 somewhat smaller than the diameter of the conductors. Thereby the conductors in the groove portions with the length L are clamped into the grooves 82. Since the groove bases of the comb grooves 98 are lower than the groove bases 100 of the grooves extending toward the sorting comb 96 (FIG. 8) the conductors are pulled into the grooves 82. In the groove portions extending toward the conductor ends with groove depths T2 the conductors are not clamped, but are only separated for the application of the material strip.

The second section 78 of the conductor support 48 is arranged after the first section 76. The second section 78 has V-shaped clamping grooves 88. These are arranged parallel to the grooves 98, 82 of the sorting comb 96 and the first section 76. The free conductor ends of the conductors which are separated in the first section 76 are clamped fast in the second section 78. The conductors are therefore tensioned between the groove portion of length L of the grooves 82 and the clamping grooves 88, whereby the conductors in the separating area of the grooves 82 are reliably held in place. Between the first section 76 and the second section 78 of the conductor support 48 is an intermediate space 80 for receiving the cutting knife 36.

We claim:

1. An apparatus for connecting the free conductor ends of a conductor bundle through the temperature assisted pressing onto the conductor ends of a material strip adherable or weldable to the plastic jackets of the conductor ends which are arranged parallel to one another, including a base plate, a conductor support removably held on the base plate and a pressing mechanism with a carrier plate for a pressing stamp which carrier plate is movable perpendicularly to the base plate, characterized in that the pressing stamp (16) is movably supported on the carrier plate (14) for movement parallel to the pressing direction against spring force, and that a cutting device is arranged on the carrier plate, for cutting off the conductor ends which extend outwardly beyond the material strip and said pressing stamp.

2. An apparatus according to claim 1, further characterized in that the pressing stamp (16) is guided on the carrier plate (14) by means of a plurality of bolts (24) which pass through guide bores in the carrier plate.

3. An apparatus according to claim 1 further characterized in that the cutting device includes a knife (36) fastened to the carrier plate (14) whose cutting edge (40) is positioned between the rest position and the pressing position of the pressing surface (42) of the pressing stamp (16), and that the conductor support (48) has a recess (80) for receiving the knife (36) during the pressing process.

4. An apparatus according to claim 1 further characterized in that a sliding guide is provided on the base plate (10) for a slide (46) carrying the conductor support (48), which slide is moveable in the sliding guide (44) parallel to the base plate (10) between a work position, in which the conductor support (48) is aligned in the pressing direction with the pressing stamp (16), and a preparatory position.

5. An apparatus according to claim 4 further characterized in that the slide (46) is guided by rails (52, 54) of the sliding guide (44) on the bottom plate (50) through a groove and spline guide, and that the working position of the slide is defined by a stop (46) arranged in the path of sliding movement.

6. An apparatus according to claim 5 further characterized in that in the direction away from the preparatory position one rail (54) is longer than the other rail (52) by the length of the slide (46) as measured in the sliding direction and at its outwardly extending end is connected with a bar (66) arranged perpendicularly to the rails (52, 54).

7. An apparatus according to claim 4 further characterized in that the slide (46) has through guides arranged parallel to the pressing direction, which through guides in the work position of the slide align with recesses (72) in the bottom plate (50) of the sliding guide (44) and with bolts (74) on the carrier plate (14).

8. An apparatus according to claim 1 further characterized in that a holding device (90) is provided for holding the conductor bundle (96) fast relative to the conductor support 48.

9. An apparatus according to claim 3 further characterized in that the conductor support (48) at least on one side of the recess (80) for receiving the knife has clamping grooves for receiving the conductor ends (92) which clamping grooves are arranged parallel to one another and perpendicular to the recess (80).

10. An apparatus according to claim 1 further characterized in that the holding device (90) is position lower than the groove bases of the grooves (82) on the upper side of the conductor support (48) and that the grooves (82) have constant depth groove bases (100) in a first portion remote from the holding device (90) and which grooves in a second portion directed toward the holding device (90) descend to a larger depth T1 in which the width of the grooves (82) is so much smaller than the cross-section of the conductors that the conductors are held fast in the grooves.

11. An apparatus according to claim 10, further characterized in that the groove profile of the grooves (82) of the conductor support (48) is at least nearly V-shaped.

12. An apparatus according to claim 10 further characterized in that the depth of the groove bases (100) in the first portion of the grooves (82) of the conductor support (48) correspond generally to half the diameter of the conductors.

13. An apparatus according to claim 10 further characterized in that between the holding device (90) and the conductor support (48) is a sorting comb (96) with comb grooves (98) for the pre-sorting of at least two conductors per comb groove (98) with the groove bases of the comb grooves (98) lying below the groove bases (100) of the grooves (82) of the conductor support (48).

* * * * *